April 3, 1951 A. R. PRAIS 2,547,774
INTERNAL SCREW-THREAD CONCENTRICITY INDICATOR
Filed June 10, 1948

Alfred R. Prais
INVENTOR.

BY *Clarence A. O'Brien*
*and Harvey B. Jackson*
Attorneys

Patented Apr. 3, 1951

2,547,774

UNITED STATES PATENT OFFICE 2,547,774

INTERNAL SCREW-THREAD CONCENTRICITY INDICATOR

Alfred R. Prais, Garfield, N. J.

Application June 10, 1948, Serial No. 32,073

7 Claims. (Cl. 33—199)

This invention relates to certain new and useful improvements in measuring instruments and tools and in particular, has reference to a special tool which may be readily and accurately employed to check, gage and reliably indicate the concentricity relationship between the minor diameter and pitch diameter of internal screw-threads.

It is a matter of common knowledge that it is important to know the stated concentricity relationship between the factors pitch diameter and minor diameter to, in turn ascertain eccentricities between said two diameters and whether admissible limits and margins of deviation have been carefully adhered to. Such a condition, usually, is caused by faulty tapping jigs, faulty drill jigs, or both. We will mentally picture, for instance, an exaggerated example of eccentricity between pitch diameter and minor diameter of internal screw-threads wherein the greater thread depth is to the left of the pitch diameter axis or centerline and the shallow thread is to the right and thus on the diametrically opposite side of said centerline. Under this arrangement the shallow thread to the right of the centerline will obviously decrease the holding strength of the thread considerably and will cause high surface loading of the thread surfaces on this, the right side, thus rendering the screw-threaded bore proportionately defective.

The aforementioned condition may go unnoticed if the thread is not checked for this relationship to insure that the eccentricity is being held within certain satisfactory limits. Such a check is especially important in aircraft engine members where parts are operating with small factors of safety and are being stressed very nearly to their yield points.

Heretofore, the only way that this could be checked was by cutting a section through the thread or tapped hole in question, had meant spoiling the part. Hence, only a very few parts could be checked and no part that was checked could be used. Therefore, no parts that are used could be checked for this requirement and parts with internal threads faulty in his respect could be assembled into a mechanism of critical importance (such as an aircraft engine).

It is an object of the invention to provide a practical instrumentality on which a conventional or marketed type dial gauge indicator may be satisfactorily employed, said instrumentality affording effective means for checking the conditions abovementioned without cutting sections through the thread or spoiling the part in which the thread has been formed.

Another object of the invention is to provide an instrumentality to meet and overcome the recited objections and difficulties in that it is characterized by an appropriate adapter which is expressly designed to be inserted and lodged in the screw-threaded bore which is to be gauged, the external diameter of said adapter, which by preference takes the form of a cylinder or sleeve, corresponding to the minor diameter of said bore and the exterior surface of the adapter being adapted to snugly contact the crests of the screw-threads, the inner checking end of said adapter being provided with a projectable and retractable feeler having a spherical radius equal to the radius of the "best wire size" for the thread and which engages the thread at pitch diameter, said feeler coacting with an actuater in the adapter and said actuator, in turn, coacting with a dial indicator carried by the adapter, all of said components being scientifically and mechanically coordinated to indicate the eccentricities, if any, between pitch diameter and minor diameter as desired. In carrying out my objectives a structure of the aforementioned type is adopted and used and is novel in that the feeler means at the detecting end of the adapter cylinder takes the form of a plunger which is transverse to the longitudinal axis of the adapter and is radially projectable and retractable and when fully retracted may be maintained within the confines of the outer diameter of the adapter to facilitate the step of inserting and removing said adapter.

Another phase of the invention has to do with an adapter cylinder the upper end of which is equipped with a cap-like knob the latter being used for turning the adapter and feeler means for thread gauging, said knob serving as a convenient base for a post which in turn constitutes a support for the conventional type of dial indicator.

A still further object of the invention invokes the use of structural adaptations along the lines described together with an actuator which takes the form of a lever and which is hingedly mounted intermediate the ends of the actuator in the central portion of the adapter, one end of the actuator, which is spring pressed, projecting through the outer or upper end of the adapter to function as a trip and also a finger-piece, the other end being operatively connected with the feeler equipped plunger.

Other objects, features and advantages will become more readily apparent from the following description and the accompanying illustrative drawings.

In the drawings, wherein like numerals are employed to designate like parts throughout the views.

Figure 1:
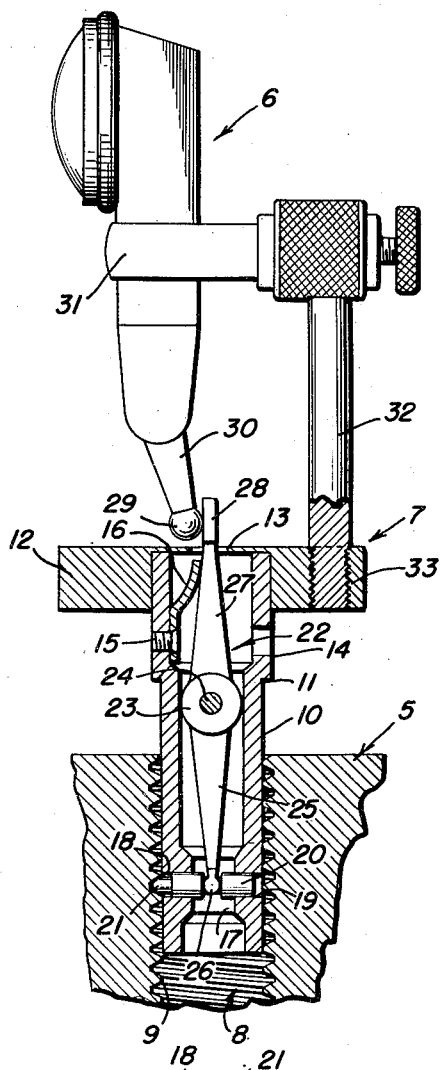
Figure 1 is a view of the part having the internally screw-threaded bore which is to be measured, said view including the invention, a concentricity indicator, and the dial indicator.
Figure 2:
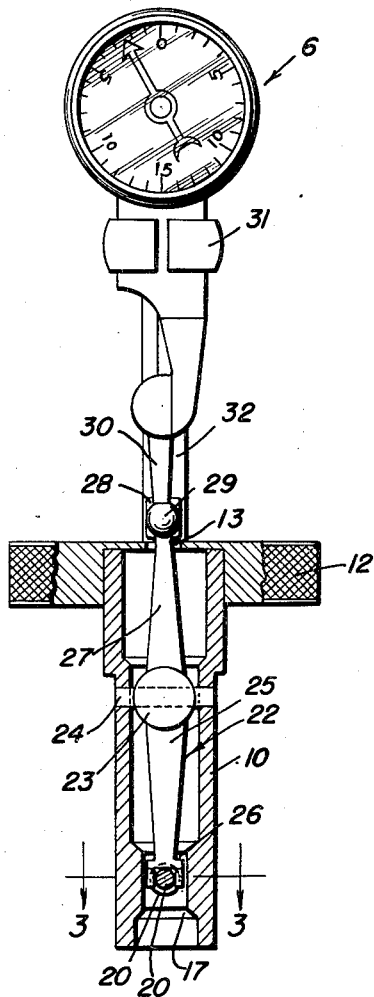
Figure 2 is a view at right angles to Figure 1, with parts in section and elevation and with the two removed from the threaded bore.
Figure 3:
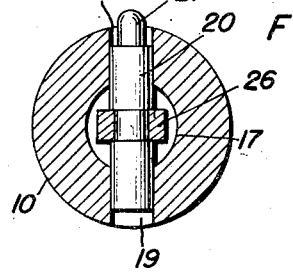
Figure 3 is an enlarged transverse or cross section on the line 3—3 of Figure 2, looking in the direction of the arrows.

Referring to Figure 1 of the drawings, the three major parts comprise the work-piece 5, a conventional dial indicator 6 and my invention 7. The part 5, which is any work-piece has an internal screw-threaded bore 8, the threads are denoted by the numeral 9.

The aforementioned adapter, which is insertable and removable in relation to the screw-threaded bore is preferably in the form of an elongated cylinder 10 whose outside diameter is nicely conformable with the minor diameter of the screw-threaded bore. Therefore, the outer surface of the cylinder contacts the crest portions of the screw threads. In practice the diameter of said cylinder is made to clear the expected minimum minor diameter by .001 to .003, depending upon the thread size. It will be noted that even though this diameter may be slightly a loose fit with the minor diameter of the hole or bore, the accuracy of the concentricity reading will not be affected to any practical extent. The upper end portion of the cylinder is enlarged to provide a shoulder, as at 11. On this enlarged end I provide cap-like suitably knurled knob or finger grip 12 this having a central hole 13 of limited diameter in registry with the axis of the adapter cylinder. There is a sight opening 14 on one side of the enlarged head portion of the cylinder and a screw, internally arranged on the opposite side as at 15, serves to hold in place a tension spring 16. The lower insertable end portion of the cylinder is internally enlarged to reinforce same as at 17 and here I provide diametrically opposite guide openings 18 and 19 for the aforementioned plunger 20. The plunger fits snugly in the holes and is projectable and retractable and has a reduced central hub portion and a reduced end portion at the left which end portion 21 constitutes the feeler and which has a properly sized spherical radius for the thread, said feeler 21 engaging the thread at the pitch diameter and of course riding in the grooves between the respective threads. The total length of the plunger, including the feeler, is slightly less than the cross section of the cylinder. Therefore, the plunger may be wholly retracted within the confines of the cylinder to facilitate inserting and removing the latter. The actuator which is substantially confined within the limits of the adapter cylinder is a lever and is denoted by the numeral 22. It has a hub portion 23 hingedly mounted as at 24. One end or arm portion of the lever as at 25 terminates in a fork 26 which straddles the reduced hub portion of the plunger and serves to work the plunger back and forth in the holes 18 and 19. The upper end or arm portion 27 extends through and beyond the clearance hole 13 where it terminates in a substantially rectangular finger grip 28 which also functions as a trip and which is engageable with a ball 29 on the operating stem 30 of the dial gauge 6. The dial gauge is held in place by clamp 31 connected with a suitable supporting post 32 threaded eccentrically on the knob as at 33. The cap is simply pressed or threaded to the headed part of the cylindrical adapter and supports the indicator post 32. The lever clearance hole in the cap is of such size that when the lever is pressed so that it touches the side of the hole, the plunger is retracted within the body and both ends of the plunger will clear the lower body diameter so that the instrument may be readily inserted in or withdrawn from the threaded hole. The lever is pivoted at the center so as to give a 1 to 1 ratio of motion from the plunger to the indicator. The flat spring 16, which bears against the arm 27 exerts the proper degree of force against the lever and thus retains the instrument in position in the hole when taking readings of the indicator.

When inserting the instrument into a threaded hole the plunger is retracted into the body by pressing the lever to the left, allowing the adapter to slide into the hole to the proper depth. Several readings may be taken at different diametral positions and various depths, which can be attained by simply turning the instrument at the knurled cap, or by retracting the plunger each time and resetting the body to a different depth and diametral position. The difference between the two extreme readings obtained is the eccentricity in full indicator reading.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. An instrumentality for checking, gauging and indicating the concentricity as well as eccentrically relationships between the minor diameter and pitch diameter of internal screw-threads comprising an elongated adapter cylinder adapted to be inserted in a screw-threaded bore with its exterior surface in snug fitting contact with the crest portions of the screw threads in said bore, a detecting and measuring end portion on said cylinder, said end portion being provided with diametrically opposite plunger holes, a one piece plunger transverse to the longitudinal axis of said cylinder, said plunger having precision made end portions slidable with requisite nicety in said holes, said plunger being of a total length slightly less than the outside diameter of the cylinder and being provided at one end with an extension terminating in a feeler having a spherical radius adapted to ride in grooves between the threads and adapted to engage the threads at the point of pitch diameter, and a dial actuating lever pivotally mounted inside of said cylinder and operatively engaging the intermediate portion of the plunger at one end.

2. An internal screw-thread concentricity indicator of the class described comprising an open-ended cylinder, a plunger slidably mounted in one end portion of the cylinder and having a feeler projection at one end, a lever hingedly mounted centrally of its opposite ends on the interior of the cylinder, one end of said lever being operably connected with the plunger, a knurled head on one end of the cylinder, said head being of a diameter greater than that of the cylinder and centrally apertured, the adjacent end portion of said lever projecting through and beyond the aperture, and spring means mounted on the interior of the cylinder and interposed between said cylinder and an adjacent end portion of said lever, the size proportions of the last named end portion of the lever and aperture in said head being such that when said end portion of the lever is forced, against the tension of said spring, and into contact with an edge of the aperture, the plunger is retracted fully into said cylinder so as to prepare the latter for insertion or removal, as the case may be.

3. An instrumentality for checking, gauging and indicating the concentricity as well as eccentricity of relationships between the minor diameter and pitch diameter of internal screw-threads comprising an elongated adapter cylinder adapted to be inserted in a screw-threaded bore with its exterior surface in snug fitting contact with the crest portions of the screw threads in said bore, a detecting and measuring end portion of said cylinder being provided with diametrically opposite plunger holes, a plunger transverse to the longitudinal axis of said cylinder, said plunger having end portions slidable in said holes, said plunger being of a total length slightly less than the outside diameter of the cylinder and being provided at one end with a convex extension constituting a feeler adapted to ride in grooves between the threads and adapted to engage the threads at the point of pitch diameter, a lever hingedly mounted in the cylinder at a point intermediate the ends of the lever, that end of the lever engageable with said plunger having a fork straddling the plunger, the opposite end portion of the lever projecting through and beyond the adjacent end portion of the cylinder, a return spring mounted in said cylinder and engaging the last named end portion of the actuator, and a cap-like knob fitted on and substantially closing one end of said cylinder having a restricted clearance opening for passage of the adjacent end portion of said lever, said adjacent end portion being in the form of a finger grip, and a post mounted on said knob and adapted to support a dial indicator.

4. An instrumentality for checking, gauging and indicating the concentricity as well as eccentricity relationships between the minor diameter and pitch diameter of internal screw-threads comprising an elongated adapter cylinder adapted to be inserted in a screw-threaded bore with its exterior surface in snug fitting contact with the crest portions of the screw threads in said bore, a detecting and measuring end portion on said cylinder, said end portion being provided with diametrically opposite plunger holes, a one-piece plunger transverse to the longitudinal axis of said cylinder, said plunger having precision made end portions slidable with requisite nicety in said holes, said plunger being of a total length slightly less than the outside diameter of the cylinder and being provided at one end with an extension terminating in a feeler having a spherical radius and adapted to ride in grooves between the threads and adapted to engage the threads at the point of pitch diameter, and a dial actuating lever pivotally mounted inside of said cylinder and operatively engaging the intermediate portion of the plunger at one end, the pivotal mounting of said lever being at the approximate center of the lever so as to provide a one-to-one ratio of motion from said plunger to a dial indicator which said lever serves to operate.

5. The structure defined in claim 4, together with a cap-like knob fitted on and substantially closing one end of said cylinder and having a restricted clearance opening axially arranged in respect to the cylinder and adapted for passage of the adjacent end portion of said lever, said end portion of the lever being in the form of a finger-grip, said finger-grip also having the function of a dial actuating tappet, and a post mounted on said knob within the limits of the outer perimeter of the knob and adapted to support the dial indicator.

6. An instrumentality for checking, gauging and indicating the concentricity as well as eccentricity relationships between the minor diameter and pitch diameter of internal screw-threads comprising an elongated adapter cylinder adapted to be inserted in a screw-threaded bore with its exterior surface in snug fitting contact with the crest portions of the screw threads in said bore, a detecting and measuring end portion on said cylinder, said end portion being provided with diametrically opposite plunger holes, a one-piece plunger transverse to the longitudinal axis of said cylinder, said plunger having precision made end portions slidable with requisite nicety in said holes, said plunger being of a total length slightly less than the outside diameter of the cylinder and being provided at one end with an extension terminating in a feeler having a spherical radius and adapted to ride in grooves between the threads and adapted to engage the threads at the point of pitch diameter, and a dial actuating lever pivotally mounted inside of said cylinder and operatively engaging the intermediate portion of the plunger at one end, a finger gripping knob including a cap portion, said cap portion snugly receiving and fitting over the outer end of the cylinder and having an aperture in axial alignment with the axis of the cylinder, the adjacent end of said lever extending through the aperture and having a terminal portion defining a finger piece.

7. An instrumentality for checking, gauging and indicating the concentricity as well as eccentricity relationships between the minor diameter and pitch diameter of internal screw-threads comprising an elongated adapter cylinder adapted to be inserted in a screw-threaded bore with its exterior surface in snug fitting contact with the crest portions of the screw threads in said bore, a detecting and measuring end portion on said cylinder, said end portion being provided with diametrically opposite plunger holes, a one-piece plunger transverse to the longitudinal axis of said cylinder, said plunger having precision made end portions slidable with requisite nicety in said holes, said plunger being of a total length slightly less than the outside diameter of the cylinder and being provided at one end with an extension terminating in a feeler having a spherical radius and adapted to ride in grooves between the threads and adapted to engage the threads at the point of pitch diameter, a dial actuating lever having a fork at one end straddling and operatively connected with the intermediate portion of the plunger, a centrally apertured head mounted on and substantially closing one end of said cylinder, the adjacent end of the lever extending through and beyond the aperture in said head and being fashioned into a finger piece, and a flat spring anchored at one end wholly within the confines of the cylinder and in close proximity to said head and in operative contacting relationship with the adjacent portion of said lever.

ALFRED R. PRAIS.

REFERENCES CITED

The following references are of record in the file of this patent:

UNITED STATES PATENTS

| Number | Name | Date |
|---|---|---|
| 1,357,813 | Olson | Nov. 2, 1920 |
| 1,619,834 | Stein | Mar. 8, 1927 |
| 1,657,326 | Steinle | Jan. 24, 1928 |
| 2,200,181 | Lamond | May 7, 1940 |
| 2,210,560 | Allen et al. | Aug. 6, 1940 |